(12) United States Patent
Bisconti

(10) Patent No.: US 6,381,108 B1
(45) Date of Patent: Apr. 30, 2002

(54) TECHNIQUE FOR REGULATING A DC SOURCE VOLTAGE

(75) Inventor: Tony Bisconti, Denville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/425,710

(22) Filed: Oct. 22, 1999

(51) Int. Cl.⁷ .................................................. H01H 7/00
(52) U.S. Cl. ........................................... 361/18; 363/16
(58) Field of Search ............................ 363/16, 95, 97, 363/21, 131, 15, 160, 20; 323/222, 224, 265, 266

(56) References Cited

U.S. PATENT DOCUMENTS

| 3,235,784 A | * | 2/1966 | Kordes et al. ............... 363/95 |
| 4,495,554 A | * | 1/1985 | Sini et al. ................... 363/21 |
| 5,570,276 A | * | 10/1996 | Cuk et al. .................... 363/16 |
| 5,815,380 A | * | 9/1998 | Cuk et al. .................... 363/16 |
| 5,883,795 A | * | 3/1999 | Farrington .................. 363/20 |

FOREIGN PATENT DOCUMENTS

JP            7-75335      *  3/1995  ................. 363/95

* cited by examiner

*Primary Examiner*—Brian Sircus
*Assistant Examiner*—J. F. Duverne
(74) *Attorney, Agent, or Firm*—Mayer Fortkort & Williams LLC

(57) ABSTRACT

A technique for regulating a DC source voltage extracts charge from a capacitor to maintain a fixed voltage across an output load, the voltage across the output load being smaller than the DC source voltage. An output voltage that indicates a voltage drop across the capacitor is sensed and compared to a voltage reference source. The on-time of a switch, connected in series with a transformer, the series combination connected across the capacitor, is varied based on the result of the comparison, thereby controlling the voltage across the capacitor and the output voltage.

1 Claim, 3 Drawing Sheets

TECHNIQUE FOR REGULATING A DC SOURCE VOLTAGE

FIELD OF THE INVENTION

The present invention relates generally to a technique for regulating a DC source voltage, and more particularly to a method and circuit configuration for regulating a DC source voltage when the output voltage required is less than the DC source voltage.

BACKGROUND OF THE INVENTION

Various circuits have been devised to regulate battery voltage or other DC source voltages in situations in which the output voltage required is greater than the source voltage. Some of these conventional circuits, even address the need for a well-regulated output voltage. For example, one known method of regulating battery voltage is that of placing an isolated power supply, of reasonable efficiency, in series with the battery voltage, wherein only a small portion of the battery power is processed. If a voltage error correcting circuit is designed to sense the entire output voltage, tight regulation can be maintained over varying battery voltage and load conditions.

In addition, various circuits have been devised to regulate battery voltage in situations in which the required output voltage is less than the source voltage and galvanic isolation is not required. Often times, an efficient method is required that yields maximum efficiency when the input to output differential voltage is relatively small.

Turning now to the circuit of FIG. 1(a) and the corresponding graph of FIG. 1(b), the basic simplified circuit operation can be described. First, at time T=0, a bucking capacitor C1 is fully discharged, placed in series with the DC source, and the output load Rload is at the DC source voltage (in this example, 27 volts). As illustrated in FIGS. 1(a) and 1(b), the capacitor C1 voltage will increase over time as it accumulates charge, causing a corresponding reduction in the output voltage across Rload. In this example, as shown in FIG. 1(b), the output voltage will ultimately fall to zero.

If however, a method were implemented to remove the capacitor C1 charge, in a controlled and continuous manner, the charge accumulating in C1, and consequently the voltage across C1, could be maintained at any desired level. Since the output voltage is equal to Vsource−V(C1), the output voltage could also be maintained at any desired level, simply by varying the voltage across C1. In addition, if the charge could be recycled (i.e., returned to the source), the circuit efficiency will be vastly improved.

One known technique in which to remove or extract the charge across capacitor C1 is illustrated in FIG. 2. As shown, a switch S1, in series with a resistor R1, is placed across capacitor C1. By closing S1, the charge across capacitor C1 is dissipated through resistor R1, thereby reducing the C1 charge buildup. However those skilled in the art will certainly appreciate that this technique has the disadvantage of being lossy (i.e., of "losing power").

Accordingly, it is desired to develop a technique for regulating a DC source voltage in a manner to provide an output voltage that is less than the source voltage while maintaining maximum efficiency. More specifically, it is desired to develop a technique for removing the capacitor C1 charge, in a controlled and continuous manner, thereby providing the ability to maintain the output voltage at any desired level by varying the voltage across C1, while also recycling the removed charge (i.e., returning the removed charge to the source), thereby vastly improving the overall circuit efficiency.

SUMMARY OF THE INVENTION

The present invention solves these problems by providing an efficient method and circuit configuration for regulating DC source voltage.

The method, and corresponding circuit, for extracting charge from a capacitor to maintain a fixed voltage across an output load, the voltage across the output load being smaller than a source voltage, includes the steps of sensing an output voltage that indicates a voltage drop across the capacitor, comparing the sensed output voltage to a voltage reference source and varying the on-time of a switch connected across the capacitor, the switch connected in series with a transformer, based on the result of the comparing step, thereby controlling the voltage across the capacitor and the output voltage.

In one embodiment of the invention, the sensing step is performed by a voltage divider circuit and the comparing step is performed by a voltage error correcting amplifier.

In a further aspect of the invention, when the switch turns on, the method includes the steps of connecting the capacitor across the primary winding of the transformer, thereby superimposing the voltage charge on the capacitor across the secondary winding of the transformer and creating an alternating transformer secondary current, converting the alternating transformer secondary current to half-cycle DC current and filtering the half-cycle DC current into steady state DC current.

Again, in a specific embodiment of the invention, the converting step is performed by a rectifier having an anode connected to a first terminal of the secondary winding and the filtering step is performed by an inductor and a capacitor.

In yet a further aspect of the invention, when the switch turns off, the method further provides for recovering and recycling the energy stored in the transformer and in one embodiment, uses a clamp winding and rectifier to perform this function.

In a specific embodiment of a circuit for extracting charge from a first capacitor to maintain a fixed voltage across an output load, the circuit includes a first capacitor connected in series between the DC source voltage and the output load, a transformer and a switch connected in series with the transformer, the series combination being connected across the first capacitor. A pulse width modulator generates drive pulses to drive the switch, a high side driver is coupled between the switch and pulse width modulator, a voltage divider circuit senses an output voltage and an error correction amplifier, coupled between the voltage divider circuit and pulse width modulator, compares the output voltage sensed by the voltage divider circuit to a voltage reference source. The circuit operates such that the pulse width modulator generates drive pulses to vary the on-time of the switch based on an output signal from the error correction amplifier and modifies the on-time of the switch to maintain a fixed voltage across the output load.

In a yet further aspect of the invention, the circuit includes a first rectifier having a first side coupled to a first terminal of the secondary winding of the transformer and converting the transformer secondary current to half-cycle DC current, a second capacitor having a second side coupled to a second terminal of the secondary winding of the transformer and a second rectifier having a first side coupled to the second terminal of the secondary winding of the transformer and a second side coupled to a second side of the first rectifier. The second rectifier allows the transformer secondary current to flow continuously during the time intervals when the switch is off. An inductor is coupled between the second side of the second rectifier and a first side of the second capacitor, and, together with the second capacitor, filters the half-cycle DC current from the first rectifier into steady state DC. An output filter capacitor is coupled between a second side of the first capacitor and ground and a third rectifier has a first side coupled to a second side of the inductor. A clamp winding is coupled between a second side of the third rectifier and ground, and the clamp winding and the third rectifier recover and recycle the magnetizing energy stored in the transformer during "off-time" of the switch. Specifically, when the switch closes, it connects the first capacitor across the primary winding of the transformer, superimposing the voltage across the first capacitor across the secondary winding of the transformer, and the transformer allows the charge removed from the first capacitor to be fed back to the DC source voltage.

DETAILED DESCRIPTION

Figure 1A:
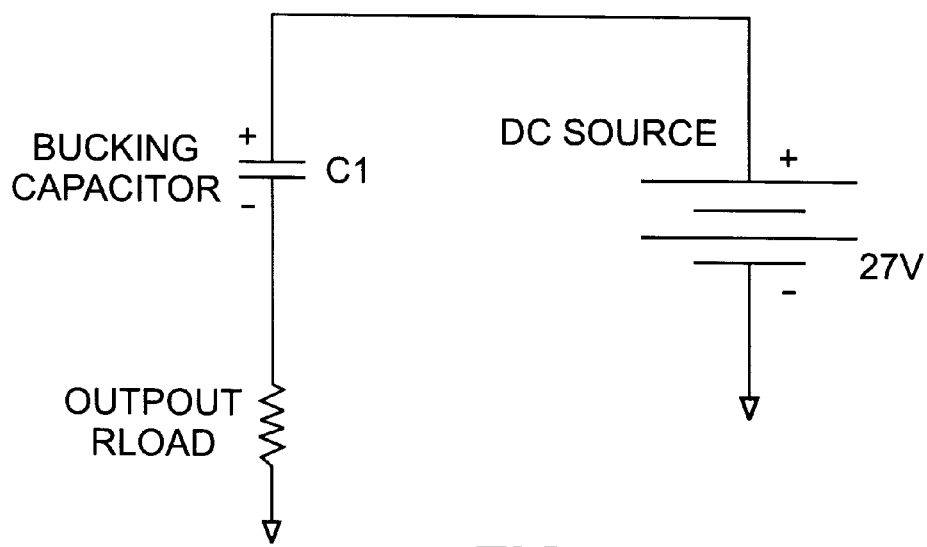
FIGS. 1(a) and 1(b) depict, respectively, a simplified circuit and graph, illustrating basic circuit operation of a DC source, bucking capacitor and output load.
Figure 1B:
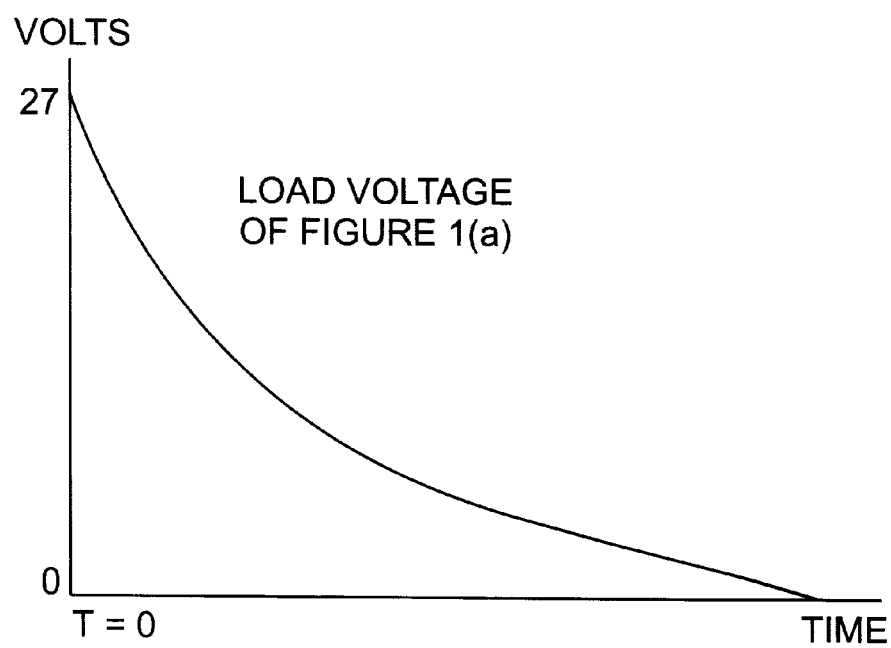
Figure 2:
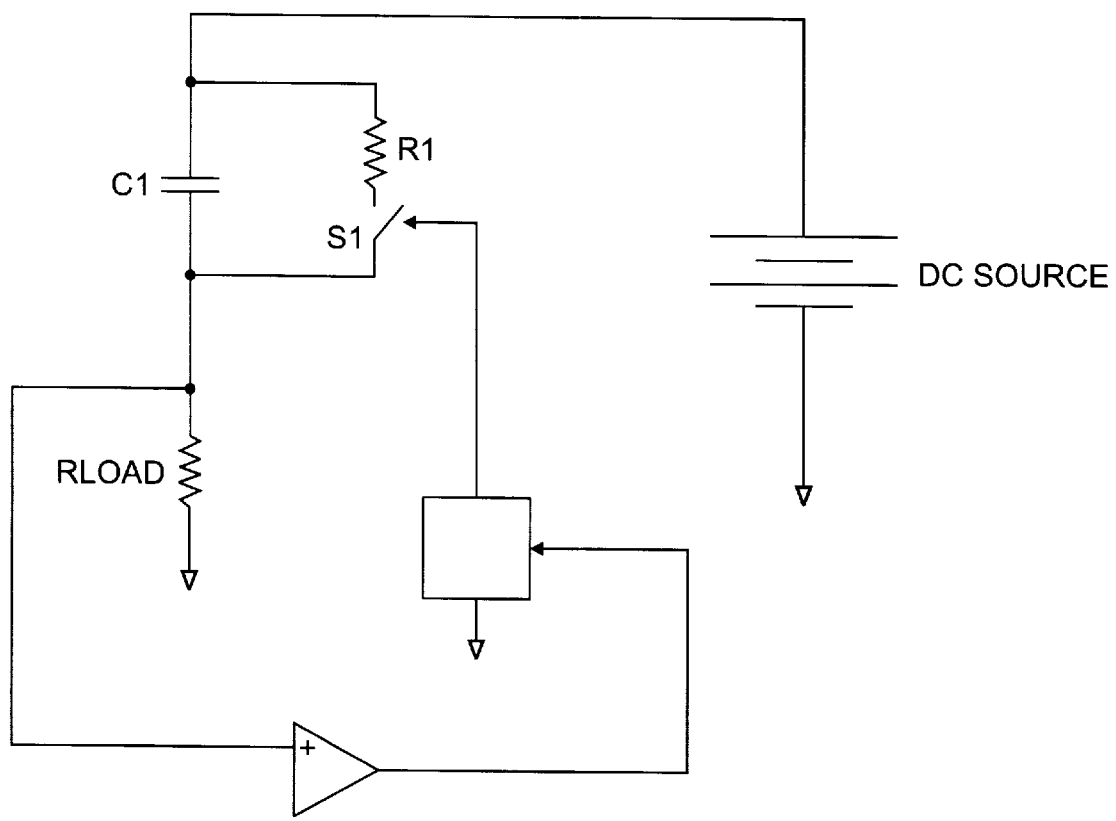
FIG. 2 depicts an illustrative circuit implementation for controlling charge across a capacitor.

While this invention is susceptible of embodiment in many different forms, there is shown in the drawings and will herein be described in detail, specific embodiments, with the understanding that the present disclosure is to be considered as an example of the principles of the invention and not intended to limit the invention to the specific embodiments shown and described.

Figure 3:
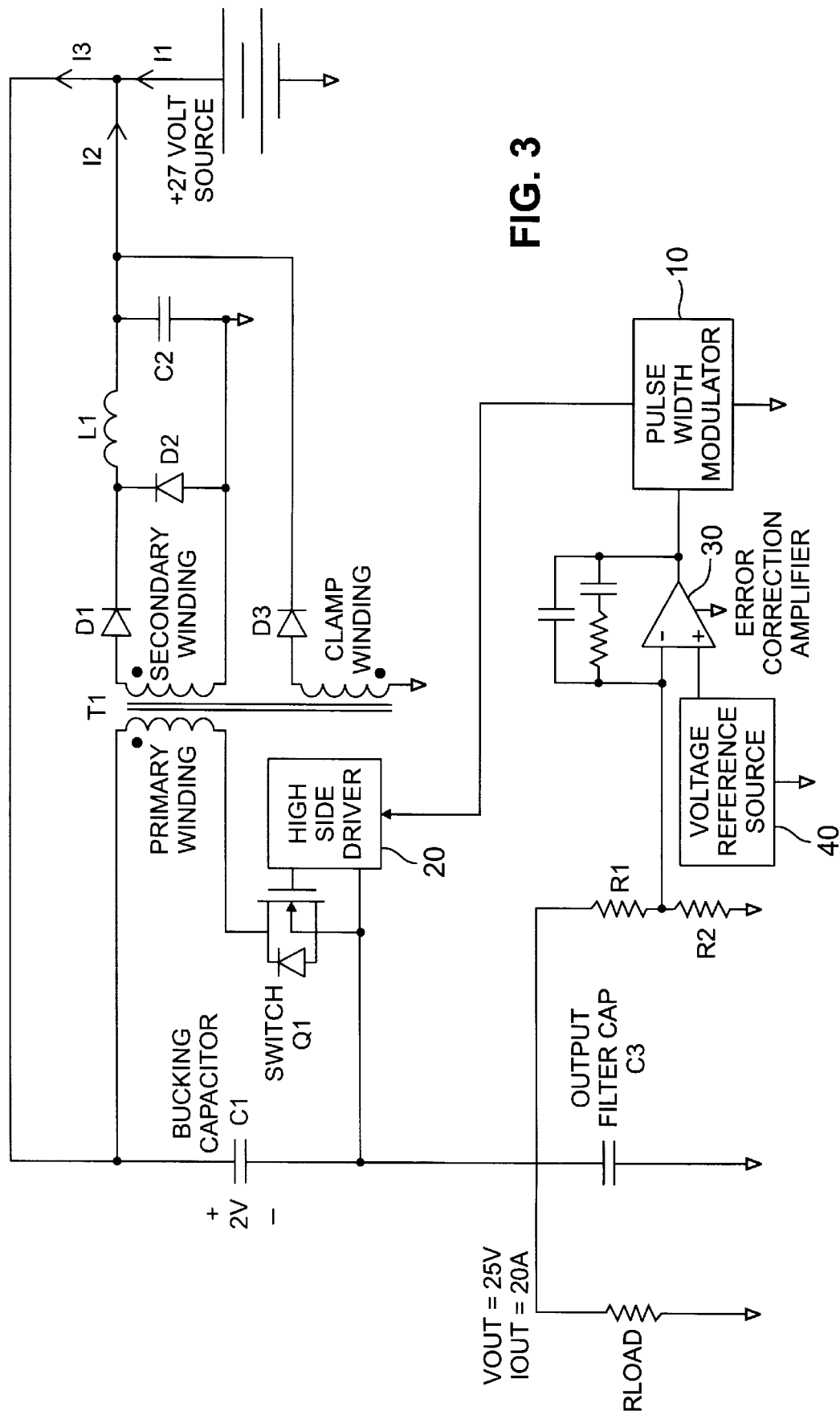
FIG. 3 depicts a circuit in accordance with the principles of the present invention.

More specifically, referring to FIG. 3, Vsource provides the DC source to the circuit (in the illustrative example of FIG. 3, Vsource is 27 volts). Capacitor C1 is again placed in series with Vsource and Rload. A switch Q1 is, together with transformer T1, connected across capacitor C1. Q1 drive pulses are generated by pulse width modulator 10, whose frequency is determined by several performance factors, but is typically a fixed frequency between 50 and 500 kHz. A high side driver 20 is provided between switch Q1 and pulse width modulator 10 (note that high side driver 20 is required since switch Q1 and the entire primary side power circuit is not referenced to ground, i.e., is floating).

When switch Q1 turns on, i.e. "closes", it connects capacitor C1 across the primary winding of transformer T1, superimposing V(C1) across the secondary winding of transformer T1. By transformer action, Vsecondary will develop across the secondary of transformer T1 (Vsecondary is equal to V(C1) multiplied by the primary-to-secondary turns ratio). The transformer turns ratio is chosen so that the secondary voltage is greater than the source voltage (27 volts in this illustration of FIG. 3), which allows the current I2 to flow. Accordingly, the current I1 flowing out of the source is always less than the load current I3 by the quantity I2. Specifically, this can be stated as I3=I1+I2. More generally, transformer T1, having a primary winding $T1_P$ and a secondary winding $T1_S$, allows the charge removed from capacitor C1 to be fed back to the battery terminal and combined with the battery current I1 to become the load current I3.

More specifically, rectifier D1, the anode of which is connected to a first terminal of the secondary winding T1s, converts the alternating transformer secondary current to half cycle DC current. Inductor L1, along with capacitor C2, filter the current into steady state DC. Rectifier D2, the anode of which is connected to a second terminal of the secondary winding $T1_S$, allows the secondary current to flow continuously during the time intervals when Q1 is off The cathodes of diodes D1 and D2 are connected in common to inductor L1. A clamp winding, together with its associated rectifier D3, recovers and recycles the magnetizing energy stored in transformer T1 during Q1 off times.

Even more specifically, during Q1 on-time, energy is delivered to the secondary circuit. Due to the physics of the transformer, energy will also accumulate in the transformer, referred to as magnetizing energy. Therefore, at the end of the Q1 on-time, the instant Q1 turns off, the transformer's magnetic field, which now exists solely due to the stored magnetizing energy, will change direction. This in turn will cause the voltage across the clamp winding to reverse polarity. When the clamp winding voltage exceeds Vbattery+V(D3) (which now becomes forward biased) current will be flowing towards the battery terminal. This current, combined with the battery current, is ultimately returned to the load.

If the magnetizing energy is not recovered, it will, at best, result in additional power loss. More likely, if the magnetizing energy is left uncontrolled (e.g., no clamp winding), it can result in circuit failure due to an abrupt voltage increase across the transformers' primary winding at the instant of Q1 turn off, exceeding Q1's maximum voltage limit. Since the voltage across the clamp winding generally cannot exceed the battery voltage plus the voltage drop across D3 (during Q1 off-time) and since the primary winding is magnetically coupled to the clamp winding, it will exhibit the same phenomena and limit the voltage across Q1 to a safe value.

The output voltage is sensed (the voltage across C1, plus the source voltage, with respect to ground) by means of the voltage divider (R1, R2). The voltage error correcting amplifier 30 compares the sensed voltage to a voltage reference source 40. The output signal from the error correcting amplifier 30 allows the pulse width modulator 10 to vary the "on time" of Q1 based on the sensed voltage. The "on-time" of Q1 in turn controls the voltage across C1 and ultimately the output voltage.

For example, when the sensed output voltage is less than the reference voltage 40, the pulse wide modulator 10 increases the "on-time" of switch Q1 such that the voltage across capacitor C1 decreases, thereby increasing the output voltage across Rload.

In this manner, tight voltage regulation can be maintained over varying source voltage and load conditions. Additionally, noise and ripple, which may be present at the source, will be rejected due to the large gain of the error correction amplifier 30 and the filtering property of capacitor C3.

As described above, conventional voltage regulation techniques require that the entire source power be processed. The inventive technique described herein, requires only a small portion of the source power to be processed, providing a much higher efficiency than the conventional techniques (Applicant has achieved a greater than 95% peak efficiency utilizing the inventive technique, while conventional techniques typically provide less efficiency over a voltage range). For example, referring to FIG. 3, the output voltage is regulated to 25 volts, the load current is 20 amperes and the input voltage is 27 volts. Under these conditions, a simple linear regulator circuit can achieve a peak efficiency of 92.5%. However, the efficiency will drop off rapidly if the unregulated input voltage increases.

If a conventional switching regulator were used in this example, the overall efficiency would not be much greater than 90%. Depending on the topology, the efficiency can be lower than 80% (typically).

The inventive technique will not only exhibit greater efficiency, theoretically 98% for this example, it will also maintain greater efficiency than other methods over a wider input voltage range.

In addition, the proposed method and circuit allow for a physically smaller and less expensive converter, in fact, in the illustrative example of FIG. 3, a small 2 volt, 20 amp regulator (40 watt converter) can maintain a regulated 25 volt, 20 amp (500 watt) output while the battery voltage is above 25 volts. The 40 watts of power are recycled, the only power dissipated is due to the losses in the converter, which are relatively small. For example, for a 40 watt converter at 80% efficiency, the overall efficiency is 98%, where the input power is 510 watts, the output power is 500 watts, and the power dissipated in only 10 watts.

Finally, since only a small portion of the source power is processed in the proposed technique, electromagnetic interference (EMI) and ripple are significantly reduced over conventional techniques, reducing the requirement for large filter components.

Although various embodiments are specifically illustrated and described herein, it will be appreciated that modifications and variations of the present invention are covered by the above teachings and within the purview of the appended claims without departing from the spirit and intended scope of the invention. Accordingly, it is intended that the present invention embrace all such alternatives, modifications and variations as fall within the scope of the appended claims.

What is claimed is:

1. A circuit for extracting charge from a first capacitor, to maintain a fixed voltage across an output load, the voltage across the output laod being smaller than a DC source voltage, the circuit comprising:

a first capacitor, said first capacitor being connected in series between the DC source voltage and the output load;

a transformer;

a switch, said switch being connected in series with said transformer, the series combination being connected across said first capacitor;

a pulse width modulator, said pulse width modulator generating drive pulse to drive said switch;

a high side driver, said driver coupled between said switch and said pulse width modulator;

a voltage divider circuit, said voltage divider circuit sensing an output voltage; and an error correction amplifier, coupled between said voltage divider circuit and said pulse width modulator, said amplifier comparing the output voltage sensed by said voltage divider circuit to a voltage reference source, wherein said pulse width modulator generates drive pulse to vary the on-time of said switch based on an output signal from said error correction amplifier, and further wherein modifying the on-time of said switch maintains a fixed voltage across the output load, further comprising;

a first rectifier, a first side coupled to a first terminal of the secondary winding of said transformer, said first rectifier converting the transformer secondary current to half-cycle DC current;

a second rectifier, a first side coupled to a second terminal of the secondary winding of said transformer;

a second rectifier, a first side coupled to the second terminal of the secondary winding of said transformer and a second side coupled to a second side of said first rectifier, said second rectifier allowing said transformer secondary current to flow continuously during the time intervals when said switch is off;

an inductor, coupled between the second side of said second rectifier and a first side of said second capacitor, said inductor, together with said second capacitor, filtering the half-cycle DC current from said first rectifier into steady state DC;

an output filter capacitor coupled between a second side of said first capacitor and ground;

a third rectifier, a first side coupled to a second side inductor; and a clamp winding, coupled between a second side of said third rectifier and ground, said clamp winding and said third rectifier recovering and recycling the magnetizing energy stored in said transformer during "off-time" of said switch, wherein when said switch closes, it connects said first capacitor across the primary winding of said transformer, superimposing the voltage across said first capacitor across the secondary winding of said transformer, and further wherein said transformer allows the charge removed from said first capacitor to be fed back to the DC source voltage.

* * * * *

UNITED STATES PATENT AND TRADEMARK OFFICE
CERTIFICATE OF CORRECTION

PATENT NO. : 6,381,108 B1
DATED : April 30, 2002
INVENTOR(S) : Tony Bisconti

It is certified that error appears in the above-identified patent and that said Letters Patent is hereby corrected as shown below:

Column 4,
Line 2, after "winding", change "T1s" to -- T $1_s$ --.
Line 8, after "off", add a period -- . --.

Column 5,
Line 42, after "output", change "laod" to -- load --.
Line 52, after "drive", change "pulse" to -- pulses --.

Column 6,
Line 10, before "to", change "pulse" to -- pulses --.
Line 20, after "second" change "rectifier" to -- capacitor --.
Line 20, before "side", change "first" to -- second --.
Line 37, before "inductor", add -- of said --.

Signed and Sealed this

Twenty-second Day of October, 2002

Attest:

Attesting Officer

JAMES E. ROGAN
*Director of the United States Patent and Trademark Office*